(12) United States Patent
Maclay (10) Patent No.: US 6,540,464 B1
(45) Date of Patent: Apr. 1, 2003

(54) LOADING GRAPPLE TABLE

(76) Inventor: Thomas B. Maclay, 17005 Old Highway 93, Florence, MT (US) 59833

( * ) Notice: Subject to any disclaimer, the term of this patent is extended or adjusted under 35 U.S.C. 154(b) by 0 days.

(21) Appl. No.: 09/721,599

(22) Filed: Nov. 21, 2000

Related U.S. Application Data (60) Provisional application No. 60/166,715, filed on Nov. 22, 1999.

(51) Int. Cl.$^7$ ............................................. B65G 57/32
(52) U.S. Cl. .................... 414/111; 414/470; 414/789.7
(58) Field of Search ......................... 414/111, 789.7, 414/789.8, 470, 501

(56) References Cited

U.S. PATENT DOCUMENTS

| | | | |
|---|---|---|---|
| 2,321,168 A | | 6/1943 | Tognetti |
| 2,848,127 A | | 8/1958 | Grey |
| 3,348,707 A | | 10/1967 | Anstee |
| 3,412,882 A | | 11/1968 | Stockwell |
| 3,788,495 A | | 1/1974 | Fachini et al. |
| 3,848,758 A | | 11/1974 | Carter |
| 3,884,367 A | | 5/1975 | Butler et al. |
| 3,923,176 A | | 12/1975 | Wynn et al. |
| 3,942,666 A | | 3/1976 | Pfremmer |
| 4,050,598 A | | 9/1977 | Schurz |
| 4,067,393 A | | 1/1978 | Szarkowski |
| 4,069,926 A | | 1/1978 | Jackson et al. |
| 4,073,532 A | | 2/1978 | Blair |
| 4,103,794 A | | 8/1978 | Shaw |
| 4,227,845 A | | 10/1980 | Colby et al. |
| 4,259,035 A | * | 3/1981 | De Coene et al. .......... 414/111 |
| 4,261,676 A | * | 4/1981 | Balling ....................... 414/470 |
| 4,325,666 A | | 4/1982 | Chain et al. |
| 4,370,796 A | | 2/1983 | Wilson |
| 4,376,607 A | | 3/1983 | Gibson |
| 4,548,535 A | | 10/1985 | van Die |
| 4,594,041 A | | 6/1986 | Hostetler |
| 4,789,289 A | * | 12/1988 | Wilson ....................... 414/111 |
| 4,911,596 A | | 3/1990 | Fetter |
| 4,952,111 A | | 8/1990 | Callahan |
| 5,025,992 A | | 6/1991 | Niebur |
| 5,062,757 A | * | 11/1991 | Eichenauer .................. 414/470 |
| 5,082,413 A | | 1/1992 | Grosz et al. |
| 5,211,345 A | * | 5/1993 | Siebenga .................. 414/789.7 |
| 5,288,193 A | * | 2/1994 | Warburton et al. .......... 414/111 |
| 5,333,981 A | | 8/1994 | Pronovost et al. |
| 5,340,259 A | * | 8/1994 | Flaskey ....................... 414/111 |
| 5,405,229 A | * | 4/1995 | Tilley et al. ................. 414/111 |
| 5,445,490 A | | 8/1995 | Whitehead |

(List continued on next page.)

FOREIGN PATENT DOCUMENTS

| | | |
|---|---|---|
| BE | 737495 | 1/1970 |
| GB | 2 011 346 A | 7/1979 |
| GB | 2273280 | 6/1994 |
| WO | WO 86/07234 | 12/1986 |

Primary Examiner—Kathy Matecki
Assistant Examiner—Sang Kim
(74) Attorney, Agent, or Firm—Dowrey & Associates (57) ABSTRACT

An apparatus for use with a transport vehicle having a vehicle support frame for loading, transfering, and unloading bales of hay or straw and the like. The apparatus comprises a tilting frame hingedly supported by the vehicle support frame and a loader hingedly attached to and supported by the tilting frame. The tilting frame has a side member and pivots about a first pivot axis oriented generally horizontally and transverse to the vehicle and at right angles to the side members. The loader pivots about a second pivot axis proximate to and oriented generally parallel to side member of the frame. The loader has a plurality of selectively actuated bale engaging time structures for securing bales to the loader. Each bale engaging time structure has at least one tine movable between a retracted position and a bale engaging position. The apparatus pivots a group of bales from the ground approximately 180 degrees up and onto a frame, which then tilts the group vertically so the entire group can be moved rearward by a conveyor to a collection area on the vehicle.

25 Claims, 8 Drawing Sheets

U.S. PATENT DOCUMENTS

| | | |
|---|---|---|
| 5,507,612 A | 4/1996 | Siebenga |
| 5,542,803 A | 8/1996 | Driggs |
| 5,547,334 A | 8/1996 | Baril |
| 5,607,274 A * | 3/1997 | Cook .......................... 414/111 |
| 5,690,461 A | 11/1997 | Tilly |
| 5,695,311 A | 12/1997 | Miguel et al. |
| 5,846,046 A | 12/1998 | Warburton |
| 6,171,047 B1 * | 1/2001 | Vandervalk ................ 414/111 |
| 6,312,205 B1 * | 11/2001 | Vandenberg ............... 414/111 |
| 6,328,520 B1 * | 12/2001 | Maclay ....................... 414/111 |

* cited by examiner

LOADING GRAPPLE TABLE

This application claims the benefit, under 35 U.S.C. 119(e), of U.S. Provisional Application Ser. No. 60/166,715, filed Nov. 22, 1999.

BACKGROUND OF THE INVENTION

Background Information

The prior the art includes various devices and methods for loading and stacking bales of crop material. It is well known in the art to have a table that pivots along an axis transverse to a bed of a trailer or truck to raise an array of bales from a horizontal position to a vertical position. Once in the vertical position, bales are transferred along the bed by a conveyor to make room for subsequent bales. Several devices exist to transfer the bale from the ground to the tilting table. U.S. Pat. No. 4,259,035 to DeCoene et al. discloses a side loading device using a conveyor to move small bales from the ground to the table. U.S. Pat. No. 5,607,274 to Cook discloses an extensible boom that pivots about a horizontal axis and a vertical axis to move a large bale, or an array of bales from the ground to a bed on a truck. U.S. Pat. No. 5,405,229 to Tilley et al. discloses a front loading device which clamps onto a single large bale and pivots it vertically 190 degrees to place it on a horizontally pivoting table. The table then rotates 180 degrees to make room for a second bale adjacent to the first bale. The Tilley loading device handles only one bale at a time, and requires the pivoting table to arrange two bales together.

Prior art devices for moving bales from the ground to the tilting table are all separate from the tilting table and add complexity and require additional space on the machine that loads and stacks bales. The need exists for a compact, effective loading device, which is combined with the vertically pivoting table for handling large rectangular bales.

BRIEF SUMMARY OF THE INVENTION

The present invention provides an apparatus for use with a transport vehicle having a vehicle support frame to load, transfer, and unload bales of hay or straw and the like. The apparatus comprises a tilting frame hingedly supported by the vehicle support frame and a loader hingedly attached to and supported by the tilting frame. The tilting frame has a side member and pivots about a first pivot axis oriented generally horizontally and transverse to the vehicle. The loader pivots about a second pivot axis proximate to and oriented generally parallel to the side member of the frame. The loader has a plurality of selectively actuated bale engaging tine structures for securing bales to the loader. Each bale engaging tine structure has at least one tine movable between a retracted position and a bale engaging position. A group of bales are pivoted from the ground approximately 180 degrees up and onto a frame, which then tilts the group vertically so that the entire group can be moved rearwardly on the vehicle bed by a conveyor to a collection area on the vehicle.

In one embodiment, the loader has a forward portion and a rear portion adjacent the forward portion, and both portions pivot independently about the second pivot axis. Each portion has at least one set of bale engaging tine structures. Preferably the rear portion is wider than the forward portion and it has at least two sets of bale engaging tine structures.

The loader includes a grapple assembly, a plurality of grapple brackets preferably removably fastened to the grapple assembly, and a plurality of pivot brackets. Each pivot bracket is preferably removably fastened to a grapple bracket, and each pivot bracket cooperates with a pivot member of the tilting frame to make a hinged joint.

The loader also includes a plurality of transverse members in spaced parallel arrangement supporting the bale engaging tine structures. The bale engaging tine structures include a tine shaft extending between and rotatably supported by adjacent transverse members. Each tine shaft has at least one tine attached, and the tines are preferably curved. The tine shafts rotate to move the tines between the retracted position and the bale engaging position. The bale engaging tine structures are arranged in sets longitudinally on the loader and each set is independently actuated. Each set of bale engaging tine structures includes a first subset and a second subset of bale engaging tine structures. The first subset is located near the hinged joint; the second subset is located transversely from the first subset opposite the hinged joint. The bale engaging tine structures of each subset are constructed and arranged so that the tines move inward when engaging, and outward when disengaging a bale. Each inner and outer subset of a set of bale engaging tine structures are synchronously actuated, preferably by a an extensible actuator and a linkage connecting each subset, to simultaneously engage or disengage a bale.

Each subset of bale engaging tine structures preferably includes a first and second tine shaft, and each tine shaft has at least one tine. The second tine shaft is located inward from the first tine shaft and is connected to the first tine shaft by a linkage so that both tine shafts synchronously rotate in the same direction. Preferably the first tine shaft has two tines and the second tine shaft-has one tine located longitudinally between the two tines of the first tine shaft.

The apparatus further comprises a rub bar and a crowding bar connected to the vehicle support frame. The rub bar is aligned substantially parallel to the second pivot axis and is positioned laterally so as to properly position a group of bales laterally relative to the second pivot axis. The crowding bar is an extensible bar that extends generally transversely outward from the vehicle and substantially normal to the rub bar. The crowding bar is longitudinally positioned approximately at the location of the first pivot axis, and it properly positions the group of bales longitudinally relative to the loader.

The apparatus can be used to cut and distribute bales by including at least one transverse conveyor in the loader and a traversing cutoff device connected to the vehicle support frame and traversing adjacent the loader. The transverse conveyor laterally moves bales supported on the loader, and the traversing cutoff device cuts off portions of bales moved laterally by the transverse conveyor so that the cut portion falls beyond the vehicle.

The features, benefits and objects of this invention will become clear to those skilled in the art by reference to the following description, claims and drawings.

BRIEF DESCRIPTION OF THE DRAWINGS

FIGS. 6A–6C are end elevational views of a grapple table of the present invention showing a sequence of loader motion as a bale is picked up and rotated onto a vehicle. In FIG. 6A, the loader engages a bale on the ground; in FIG. 6B the loader is rotating the bale upward; in FIG. 6C the loader is fully retracted and the bale is on the vehicle.

DETAILED DESCRIPTION

Large bales of hay or other crop material are approximately eight feet long and either four feet wide by four feet high, three feet wide by three feet high, or three feet wide by four feet high. The preferred embodiments of the grapple table illustrated here are designed to handle large rectangular bales in 12-foot wide groups of either four three-foot wide bales or three four-foot wide bales. A group of bales is pivoted from the ground approximately 180 degrees upwardly and onto a frame, which then tilts the group vertically to enable the entire group to be moved rearwardly by a conveyor to a collection area on the vehicle. Other similar embodiments within the scope of this invention can be made to handle other numbers of bales depending on the size of the vehicle available. For example, it may be desirable to pick up only one bale at a time for a small vehicle, or it may be desirable to have a bale stack less than 12 feet high, in which case the grapple table may be designed for bale group widths of 4, 6, 8, or 9-foot width groups. While the grapple table may also be designed to pick up larger groups that are wider than 12 feet, typically up to 18 feet, the resulting vertical stack is higher than 12 feet, which may be undesirable for transport.

The loading grapple table is designed to be used with a transport vehicle, such as a trailer or truck, having a conveyor bed that also uses a tilting table, typically ahead of the conveyor bed, for tilting bales of crop material onto and off of the conveyor. The loading grapple table replaces conventional tilting tables and can be used to gather and load bales for transport to another location, or it may be used to cut bales and distribute their material from the transport vehicle. When used to cut and distribute bales, the loading grapple table is used in conjunction with a transverse conveyor and a traversing cutoff device which are thoroughly described in the inventor's U.S. patent application Ser. No. 09/370,359, titled Vehicle Mounted Large Bale Loading Transporting and Unloading System, filed Aug. 9, 1999, now U.S. Pat. No. 6,328,520, which is hereby incorporated by reference.

Figure 1:
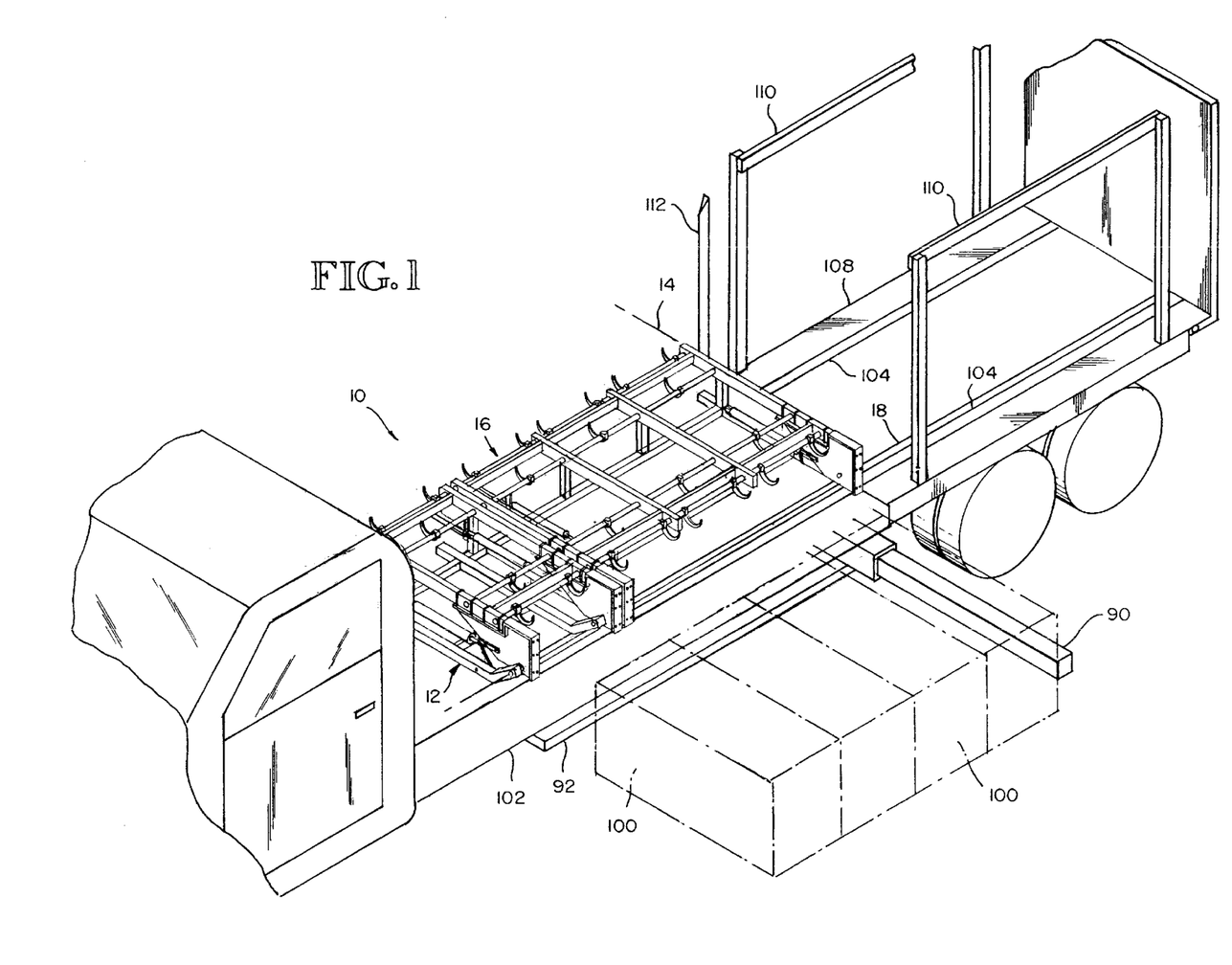
FIG. 1 is a perspective view of a vehicle having a grapple table of the present invention showing the loader before it opens to engage bales.
Figure 2:
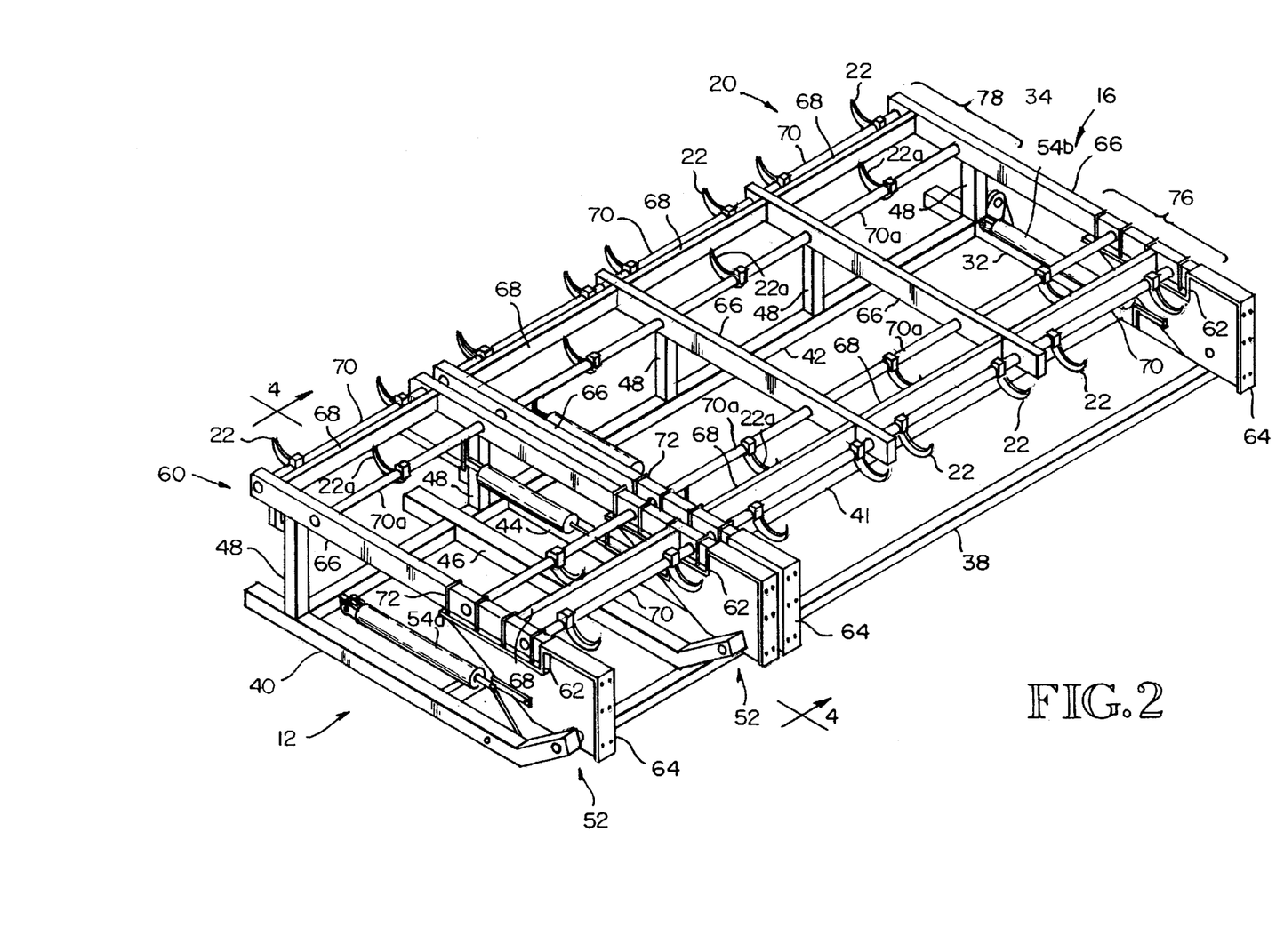
FIG. 2 is a detailed perspective view of a portion of FIG. 1 showing the grapple table.
Figures 3, 3A:
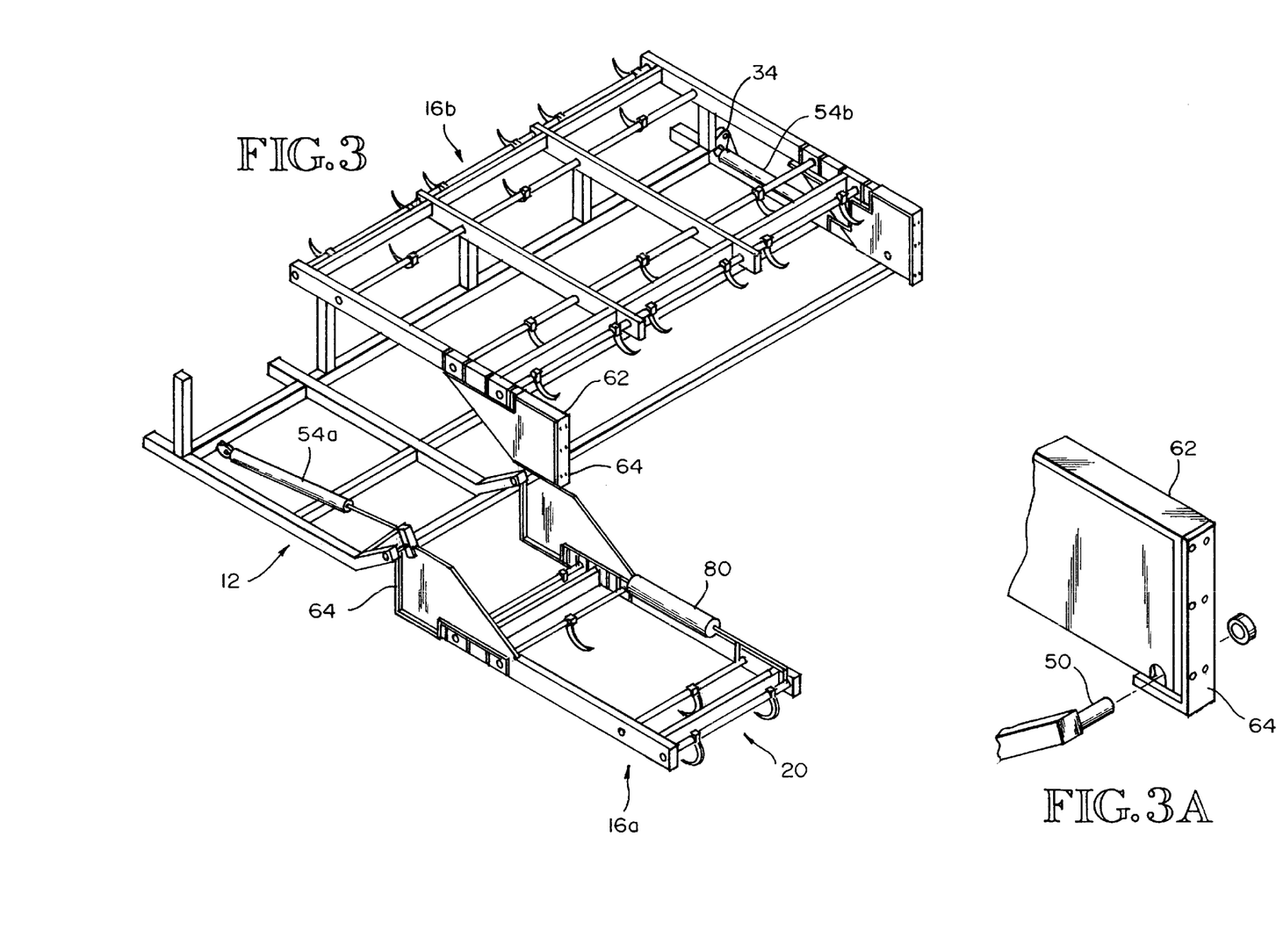
FIG. 3 is a perspective view similar to FIG. 2 showing a portion of the loader opened to a position to engage a bale.
FIG. 3A is an exploded perspective view of a hinge joint between a portion of the loader and a portion of the tilting frame.

Referring to FIGS. 1–3, an example of the preferred embodiment of the loading grapple table of the present invention is illustrated and generally indicated by the reference numeral 10. The grapple table is described below first in terms of its major structural elements and then in terms of its secondary structural and/or functional elements that cooperate to perform the bale loading function. Though the invention is described in terms of loading bales from the side of a vehicle, it is understood that the present invention may be used to load bales from the front or back of a vehicle as well, depending on the location of the grapple table.

A crowding bar 90 and a rub bar 92 are attached to the vehicle frame 102 and extend below it. Rub bar 92 is aligned substantially parallel to second pivot axis 18 and is positioned laterally so as to properly positioned a group of bales 100 laterally relative to second pivot axis 18. Crowding bar 90 is an extensible bar, preferably hydraulically actuated, that extends generally transversely outward from the vehicle and substantially normal to rub bar 92. Crowding bar 90 is longitudinally positioned approximately at the location of first pivot axis 14, and at a height such that it will contact and push the group of bales 100 as the vehicle moves forward to properly position the group of bales 100 longitudinally relative to loader 16.

Figure 4:
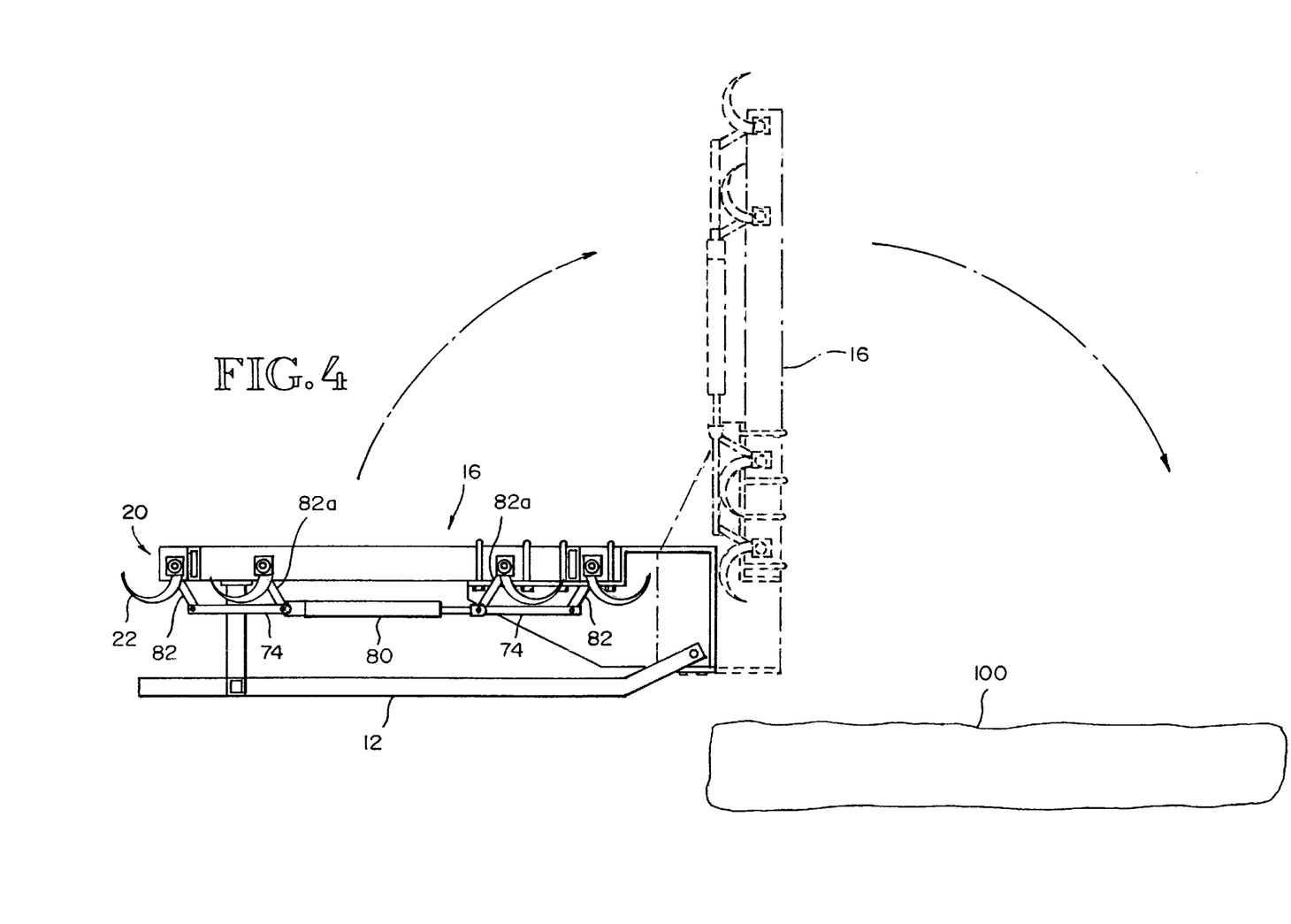
FIG. 4 is a cross sectional view of the grapple table taken along line 4—4 in FIG. 2.

Loader 16 may be a single unit designed to lift all bales in a group simultaneously, but preferably loader 16 has a forward portion 16a and a rear portion 16b adjacent the forward portion, both portions pivoting independently about the second pivot axis 18. Both portions can simultaneously be pivoted, as illustrated in FIG. 4, onto bales 100 and secured to the bales by moving bale engaging tine structures 20 to be engaged position as illustrated on portion 16a in FIG. 3. One portion can then lift the attached bales while the other portion remains extended to function as an approximately eight foot outrigger, to stabilize the vehicle if needed. Both portions can, however, lift all bales simultaneously if additional stability from an outrigger is not required. Separate actuators 54a and 54b are used to move portions 16a and 16b respectively.

When both portions of loader 16 with bales 100 are pivoted back onto tilting frame 12, tilting frame 12 then pivots about first pivot axis 14 to raise the group of bales to a vertically stacked position onto a conveyor 104, which moves the stack of bales rearwardly after being released from the loader 16.

Referring again to FIG. 2, tilting frame 12 is generally rectangular and includes a rear frame member 32, front frame member 40 opposite rear member 32, side member 38 and longitudinal members 41 and 42 connected between rear member 32 and front member 40. Rear member 32 is substantially parallel to first pivot axis 14 and has pivot members 34 and 36 which cooperate with vehicle frame 102 to allow tilting frame 12 to pivot between a horizontal position and a vertical position about axis 14. Pivot members 34 and 36 are preferably located adjacent longitudinal members 41 and 42 respectively to minimize bending in rear member 32 as tilting frame 12 is lifted. Tilting frame 12 also includes transverse internal members 44 and 46 which span between side member 38 and longitudinal members 41 and 42. All members of the tilting frame 12 are preferably made of square structural steel tubing and are welded together. These members provide structural stiffness and strength to support loader 16 and the load it imparts when lifting bales 100 onto tilting frame 12, and when tilting frame 12 tilts bales between horizontal and vertical positions.

Tilting frame 12 also includes vertical members 48 that extend upwardly from transverse member 42 and support loader 16 by engagement with transverse members 66 when the loader is in the horizontal position on top of the tilting frame.

As illustrated in FIG. 3A, tilting frame 12 has pivot members 50 on the ends of cross frame members 32, 40 and 46, proximate to the side member 38. Referring to FIG. 2, pivot members 50 cooperate with the loader 16 to make hinged joints 52.

Figure 7A:
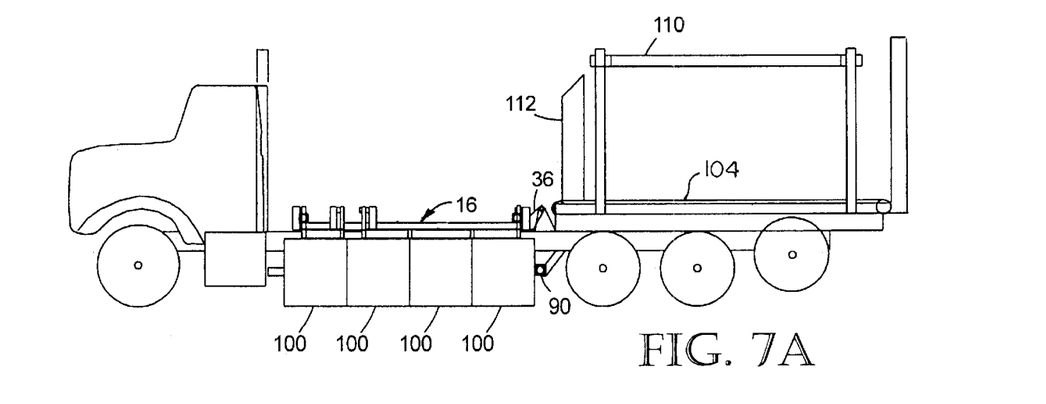
FIGS. 7A–7F are side elevational schematic views of a vehicle using a grapple table of the present invention to load a group of bales onto the vehicle, including the sequence of grapple table motions as the group of bales are picked up and rotated first onto the tilting frame of the grapple table (FIGS. 7A–7C), then tilted rearwardly onto a conveyor in a collection portion of the vehicle (FIGS. 7D–7E), the grapple table then being returned to its starting position
Figure 7B:
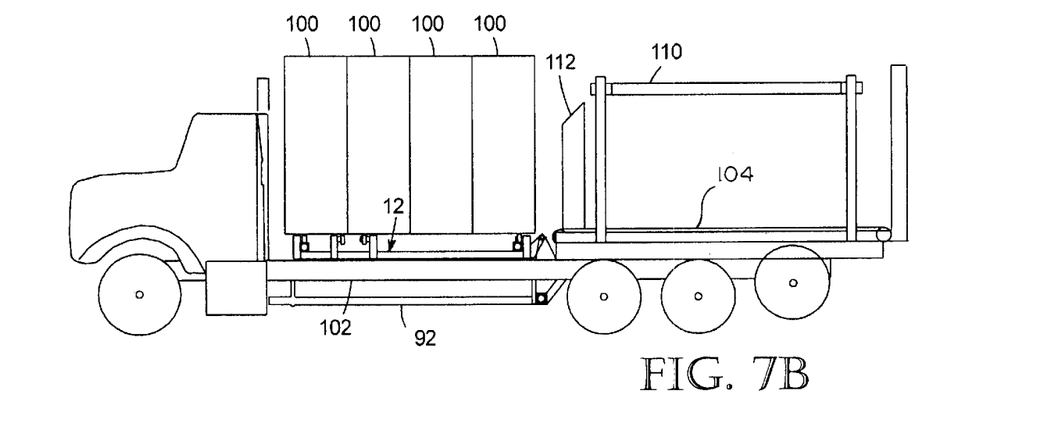
Figure 7C:
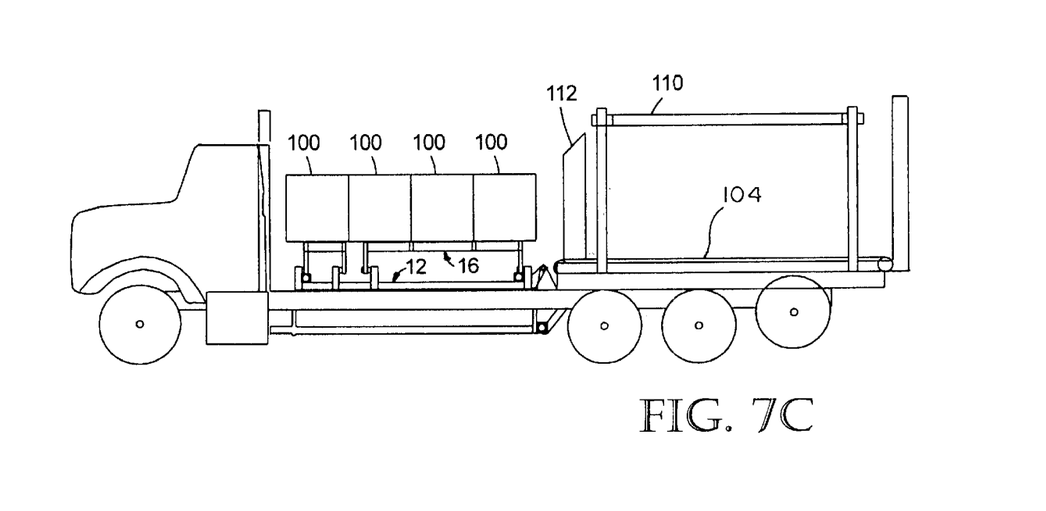
Figure 7D:
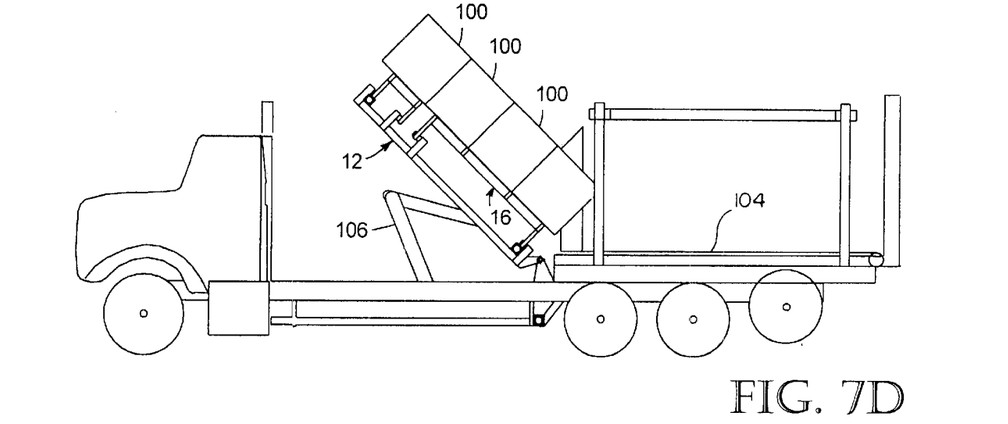
Figure 7E:
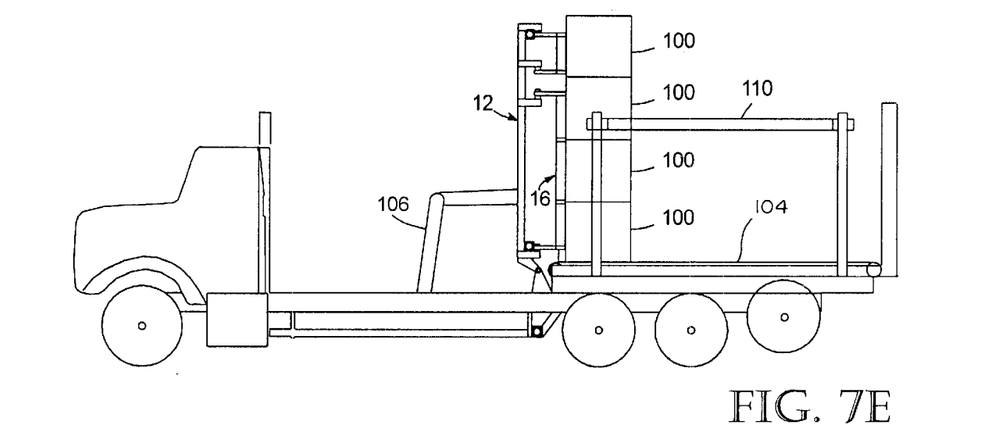

As illustrated in FIGS. 7D–7E, longitudinal members 41 and 42 provide a connection for a hydraulically actuated lifting apparatus 106 which operates between vehicle bed 102 and tilting frame 12 pivot tilting frame 12 about axis 14. Lifting apparatus 106 is similar to that used to lift the dump bed of a dump truck.

Longitudinal member 42 also provides a connection for actuators 54, 54a and 54b preferably hydraulic cylinders, which operate between loader 16 and member 42 to pivot loader 16 about axis 18. Hydraulic actuators 54 may each be a single actuator or they may be a plurality of parallel actuators depending on structural load requirements.

Figure 5A:
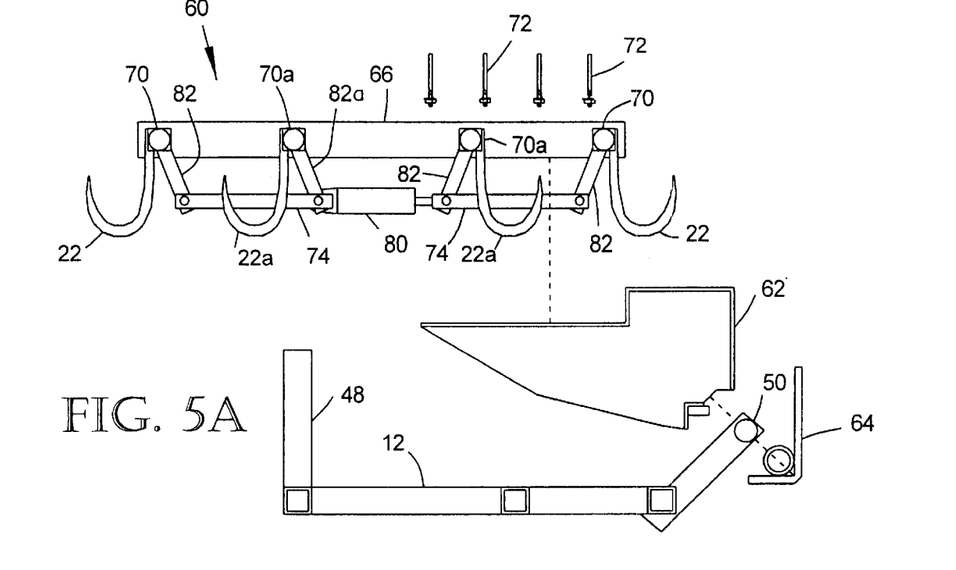
FIG. 5A is an exploded cross sectional view similar to FIG. 4.
Figure 5B:
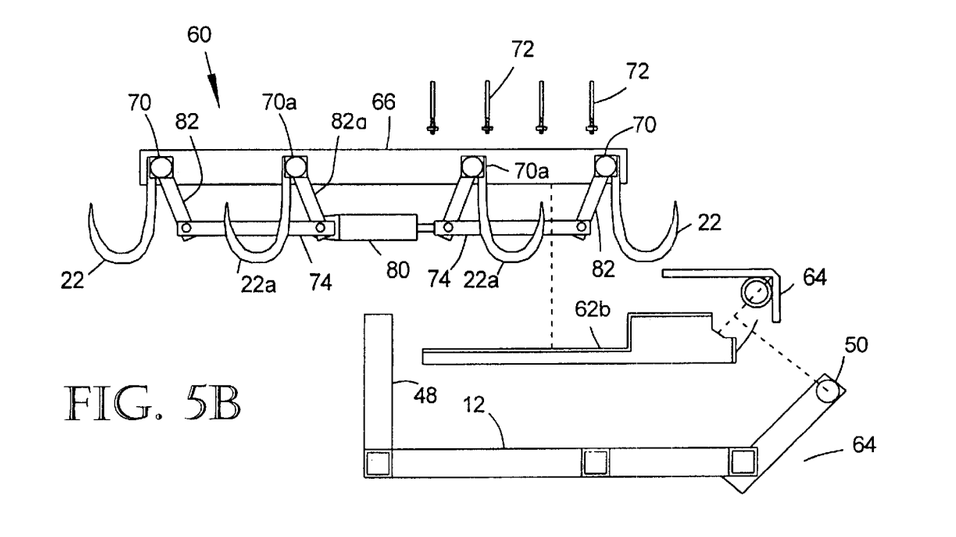
FIG. 5B is a cross sectional view similar to FIG. 5A showing another embodiment of the grapple table assembly to accommodate groups of bales having greater height.

Referring to FIGS. 3A and 5A–B, loader 16 includes a grapple assembly 60, a plurality of grapple brackets 62 fastened to the grapple assembly, and a plurality of pivot brackets 64. Each pivot bracket 64 is fastened to a grapple bracket 62 and cooperates with a pivot member 50 on the tilting frame 12 to make the hinged joint. Grapple brackets 62 are preferably removably fastened to transverse members 66, such as by U-bolts 72, and pivot brackets 64 are preferably removably fastened to grapple brackets 62, such as by bolting. The removability of grapple brackets 62 and pivot brackets 64 from grapple assembly 60 allows the configuration of loader 16 to be changed to accommodate either the three-foot high or the four-foot high bales. The embodiment shown is designed for a group of bales 100 that are approximately three feet high. For a group of bales that are approximately 4 feet high, as illustrated in FIG. 5B, grapple brackets 62 are replaced by grapple brackets 62b which are not as tall has grapple brackets 62. Pivot brackets 64 are rotated 90 degrees and fastened to grapple brackets 62b to move the vertical location of grapple assembly 60 closer to pivot member 50.

The bale engaging tine structures 20 each of which includes a tine shaft 70 extending between and rotatably supported by adjacent transverse members 66. Each tine shaft 70 has at least one tine 22 attached thereto and each tine shaft 70 rotates to move its attached at least one tine 22 between the retracted position and the bale engaging position. Tines 22 are preferably curved, and tine shafts 70 are laterally located along transverse members 66 such that tines 22 preferably engage the top of a bale 100 rather than its ends. While this arrangement provides the most secure gripping of bales 100, other arrangements, such as curved or straight tines penetrating from the end of bales, are also possible.

The bale engaging tine structures 20 are arranged in sets longitudinally on loader 16. Each set is located between adjacent pairs of transverse members 66 and can attach to one bale. Each set of bale engaging tine structures is independently actuated, such as by extensible actuator 80 and linkage 74 shown most clearly in FIGS. 4, 5A and 5B.

Referring to FIG. 2, each set of bale engaging tine structures 20 includes a first subset 76 and a second subset 78 of bale engaging tine structures. The first subset 76 is located near the hinged joint 52 and the second subset is located transversely from the first subset 76 opposite the hinged joint 52. The bale engaging tine structures of each subset are constructed and arranged so that the tines 22 move inward when engaging, and outward when disengaging a bale 100. Each first and second subsets of bale engaging tine structures 76 and 78 respectively is connected to an extensible actuator 80 by a linkage 74. The actuator 80 extends or retracts to engage or disengage the tines 22 from a bale 100. Each first and second subsets of bale engaging tine structures 76 and 78 respectively are synchronously actuated to simultaneously engage or disengage a bale 100.

Each first and second subsets 76 and 78 respectively includes a first tine shaft 70 having at least one tine 22, and preferably having two tines 22. Each first and second subsets 76 and 78 respectively also preferably includes a second tine shaft 70a having at least one tine 22a. The second tine shaft 70a is located inward from the first tine shaft 70 and is connected to the first tine shaft 70 by a linkage 74, see FIGS. 4, 5A–5B, so that both tine shafts 70 and 70a synchronously rotate in the same direction. Preferably at least one tine 22a of the second tine shaft 70a is offset longitudinally from at least one tine 22 of the first tine shaft 70. Preferably the first tine shaft 70 has two tines 22 and the second tine shaft 70a has one tine located longitudinally between the two tines 22 of the first tine shaft 70. However, tines 70 and 70a may be greater or fewer in number.

Referring to FIGS. 3, 4, and 5A–5B, bale engaging tine structures 20 include arms 82 and 82a attached to and extending substantially normal from tine shafts 70 and 70a. Each subset 76 and 78 set of bale engaging tine structures has a linkage member 74 connected between adjacent arms 82 and 82a. An extensible actuator 80, such as a hydraulic ram, is connected between linkage members 74 of a subsets 76 and 78 in a set of bale engaging tine structures. As actuator 80 extends and retracts, each set of bale engaging tine structures moves from a retracted position to a bale engaging position.

Figure 6A:
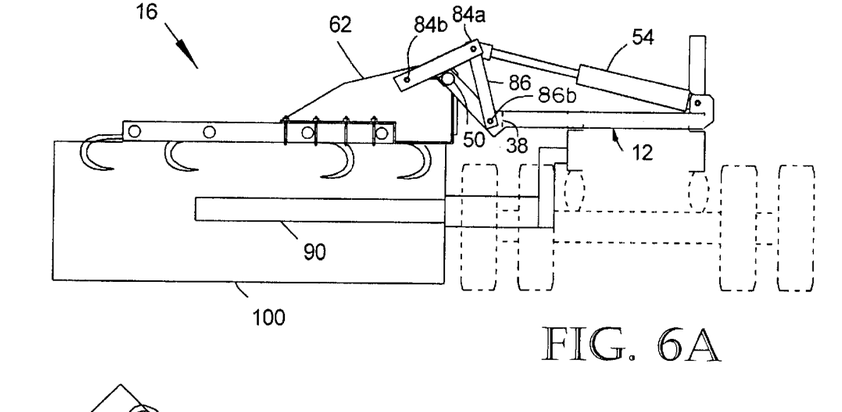
Figure 6B:
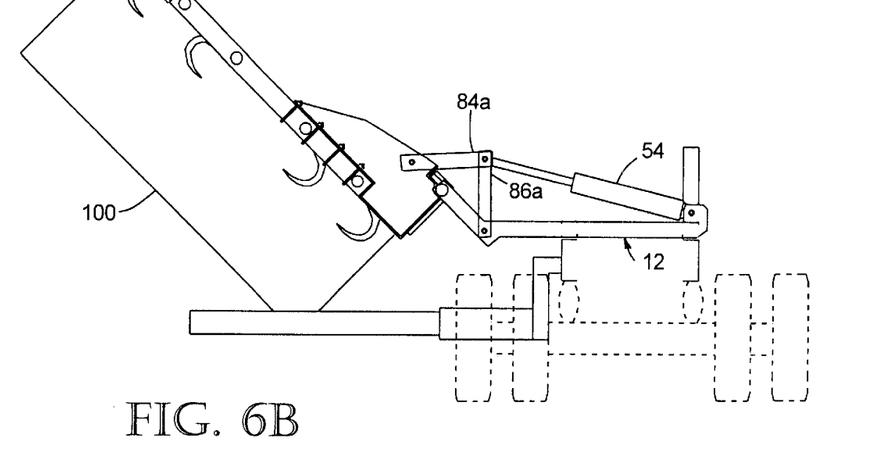
Figure 6C:
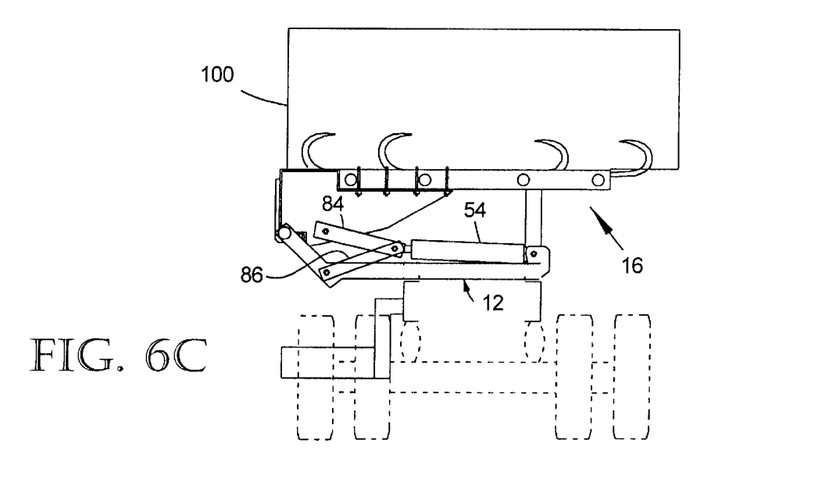

Referring to FIGS. 6A–6C, loader 16 is pivoted onto and off of tilting frame 12 by actuator 54 operating on linkage members 84 and 86. Linkage members 84 and 86 are preferably elongated rigid members, each having an end 84a and 86a pivotally attached to an end of actuator 54. The other end 84b of linkage member 84 pivotally attaches to grapple bracket 62 and the other end 86b of linkage member 86 pivotally attaches to tilting frame 12 near side member 38. When loader 16 is fully retracted as illustrated in FIG. 6C, linkage members 84 and 86 form a 'V' with an acute angle between them. As actuator 54 extends, the angle of the 'V' increases as loader 16 pivots from a retracted position to a fully extended position illustrated in FIG. 6A. Linkage members 84 and 86 are constructed and arranged relative to grapple bracket 62 and tilting frame 12 so as not to cause an over-center latching condition in either the retracted or extended positions of loader 16.

Referring to FIGS. 7A–7F, in operation the vehicle is driven along side bales 100 with crowding bar 90 extended outward from the vehicle such that the crowding bar 90 pushes against and the group of bales 100 to be loaded, and the group of bales is pushed into the corner formed between crowding bar 90 and rub bar 92. This squares out and firms the group of bales 100 to be loaded. With the bales firmly against crowding bar 90 and rub bar 92, the group of bales is in proper position so that loader 16 can be pivoted on top of bales 100. Actuators 54 are extended to pivot loader 16 off of frame 12 and onto bales 100 while bale engaging tine structures 20 are opened. When the loader 16 is on top of bales 100, as shown in FIG. 7A, actuators 80 then extend to push tines 22 and 22a into the top of the bales 100 to secure the bales to loader 16. As shown in FIG. 7B and 7C and also in FIGS. 6A–6B, actuators 54 are then retracted to pivot loader 16 with bales 100 approximately 180 degrees onto tilting frame 12.

Figure 7F:
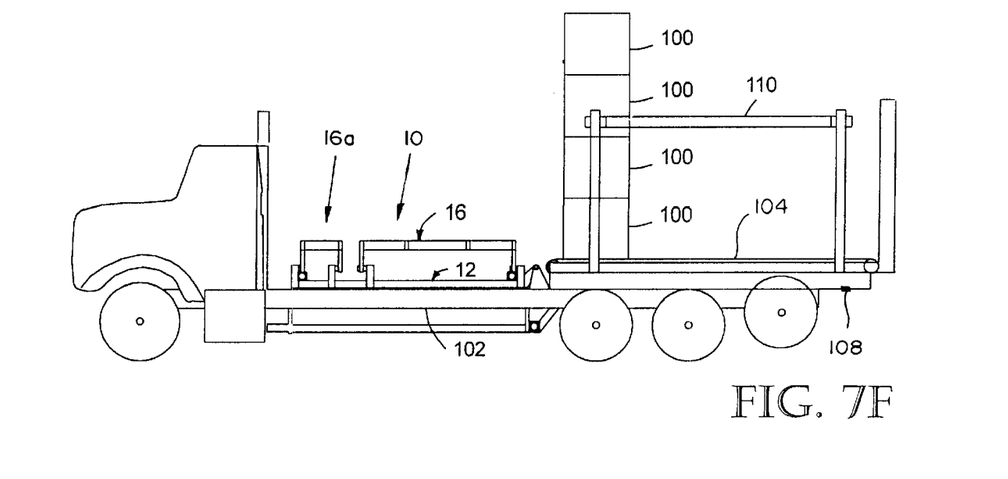

As shown in FIGS. 7D and 7E, lifting apparatus 106 is then extended to pivot frame 12 with loader 16 and bales 100 from a horizontal position to a vertical position onto conveyor 104, thereby making a vertical stack of bales. As this action occurs, the side squeeze arms 110 on the loading bed 108 of the vehicle move laterally outward so that any bales on loading bed 108 may be moved rearward to allow room for the next stack of bales. When loader 16 is fully vertical, as shown in FIG. 7E, the squeeze arms 110 move laterally inward to secure the new vertical stack of bales on loader 16, actuators 80 are then retracted so that bale engaging tine structures move to disengage tines 22 and 22a from the bales, thereby releasing the vertical stack of bales from the loader 16. Frame 12 with loader 16 can then be pivoted back down against vehicle frame 102 as shown in FIG. 7F. This cycle is repeated to fill loading bed 108 with stacks of bales 100.

The grapple table 10 can also be used to distribute or "feed" hay from the vehicle using the reverse process and a detachable cutting device 112 such as a vertical sickle bar traveling along the grapple table 10. For this operation, bales are loaded onto the loading bed 108, then grapple table 10 is tilted vertically and used to grab a vertical stack of bales 100 moved forward by conveyor 104 against grapple table 10. Grapple table 10 then tilts the stack of bales 100 down onto vehicle frame 102 in a horizontal configuration. Once horizontal, the bales are released from loader 16 by retracting tines 22 and 22a. The bales remain supported by the loader 16 and a transverse conveyor (not shown) much like conveyor 104 may be included in loader 16 to move the horizontally configured group of bales transversely across the loader 16 so that a portion of the bales overhangs the side of the vehicle opposite the hinged joint 52. The use of such a transverse conveyor in a tiltable table is thoroughly disclosed in the inventor's prior U.S. Pat. No. 6,328,520 which has been incorporated herein by reference. Although the conveyor disclosed in that application is intended to move only one bale, the same conveyor can be duplicated in spaced parallel arrangement on the grapple table 10 to move the entire group of bales across grapple table 10.

Cutting device 112 and its operation was also thoroughly disclosed in the inventor's prior U.S. Pat. No. 6,328,520. The cutting device 112 operates in substantially the same manner when used in conjunction with the grapple table of the present invention, although it travels a longer distance in cutting off a plurality of bales rather than a single bale. Cutting device 112 moves along vehicle frame 102 outside of grapple table 10 slicing off the overhanging portions of the bales, which fall to the ground. After each slice of the cutter, the bales are incrementally moved across the loader 16 by the transverse conveyor for another slice. Cutting device 112 is preferably a double-edged vertically oriented sickle bar that can slice a portion of a bale each time the sickle travels in either direction. Cutting device 112 can be stored in any channel-type holder mounted on the vehicle for protection and safety when not in use.

Bales can alternatively be distributed by using a feed processor or shredder. Forward portion 16a of the loader 16 and its associated portion of tilting frame 12 can be removed and replaced by a feed processor or shredder. Loader 16 would have a longitudinal conveyor rather than a transverse conveyor to feed bales longitudinally forward into the feed processor or shredder.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. An apparatus for use with a transport vehicle to load, transfer, and unload bales of hay or straw and the like, the vehicle including a vehicle support frame, the apparatus comprising:

a tilting frame hingedly supported by the vehicle support frame for movement through approximately 90° between a horizontal and a vertical position about a first pivot axis on said vehicle support frame at right angles horizontal to a second pivot axis;

a loader hingedly attached to and supported by the tilting frame for movement through approximately 180 degrees between a position on the tilting frame to a horizontal extended position outwardly therefrom; and gripping means on said loader for gripping a group of bales in the extended position;

whereby the loader grips a group of bales in the extended position and pivots them from the ground approximately 180 degrees up and onto the tilting frame in a horizontal position, which then tilts the group about said first pivot axis on said tilting frame.

2. The apparatus of claim 1, wherein the tilting frame includes a side member extending parallel to the longitudinal axis of the vehicle, said tilting frame being pivotable about a first pivot axis oriented generally horizontally and transverse to the longitudinal axis of the vehicle, said loader being pivotable about a second pivot axis proximate to and oriented generally parallel to the side member of the tilting frame.

3. The apparatus of claim 2, wherein the tilting frame has a rear member substantially parallel to the first pivot axis, the rear member having frame pivot members cooperating with the vehicle support frame for pivoting the tilting frame between a horizontal position and a vertical position.

4. The apparatus of claim 3, wherein the tilting frame includes a plurality of longitudinal members extending forward from the rear member, each frame pivot member being adjacent a longitudinal member.

5. The apparatus of claim 2, wherein the tilting frame has loader pivot members proximate to the side member, the loader pivot members cooperating with the loader for pivoting the loader through 180 degrees.

6. The apparatus of claim 2, wherein the loader has a forward portion and a rear portion adjacent the forward portion, both portions pivoting independently about the second pivot axis, each portion having at least one set of bale engaging tine structures.

7. The apparatus of claim 2, further comprising a rub bar and a crowding bar connected to the vehicle support frame, the rub bar being aligned substantially parallel to the second pivot axis and being positioned laterally so as to properly position a group of bales laterally relative to the second pivot axis, the crowding bar being an extensible bar that extends generally transversely outward from the vehicle and substantially normal to the rub bar, the crowding bar being longitudinally positioned approximately at the location of the first pivot axis, the crowding bar properly positioning the group of bales longitudinally relative to the loader.

8. The apparatus of claim 1, wherein the loader includes a grapple assembly, a plurality of grapple brackets removably fastened to the grapple assembly, and a plurality of pivot brackets, each pivot bracket being fastened to a grapple bracket, each pivot bracket cooperating with a pivot member of the tilting frame to make the hinged joint.

9. The apparatus of claim 1, wherein said gripping means includes a plurality of selectively actuated bale engaging tine structures for securing the bales to the loader, each said bale engaging tine structure including a rotatable tine shaft with at least one tine movable between a retracted position and a bale engaging position.

10. The apparatus of claim 9, wherein the bale engaging tine structures are arranged in sets longitudinally, and means for actuating each set independently.

11. The apparatus of claim 10, wherein each set of bale engaging tine structures includes a first subset and a second subset of bale engaging tine structures each subset including a first tine shaft having at least one tine, the first subset being located near the hinged joint, the second subset being located transversely from the first subset opposite the hinged joint, the bale engaging tine structures of each subset being constructed and arranged so that the tines move inward when engaging, and outward when disengaging a bale.

12. The apparatus of claim 11, wherein each first and second subsets further include a second tine shaft having at least one tine, the second tine shaft being located inward from the first tine shaft and being connected to the first tine shaft by a linkage so that both tine shafts synchronously rotate in the same direction.

13. The apparatus of claim 12, wherein the at least one tine of the second tine shaft is offset longitudinally from the at least one tine of the first tine shaft.

14. The apparatus of claim 13, wherein the first tine shaft has two tines and the second tine shaft has one tine located longitudinally between the two tines of the first tine shaft.

15. The apparatus of claim 11, wherein each inner and outer subset of a set of bale engaging tine structures is synchronously actuated to simultaneously engage or disengage a bale.

16. The apparatus of claim 15, wherein each inner and outer subset of a set of bale engaging tine structures is connected to an extensible actuator by a linkage, the actuator extending or retracting to engage or disengage a bale.

17. The apparatus of claim 1 further comprising:
an extensible actuator connected between the vehicle support frame and the tilting frame for pivoting the tilting frame between a substantially horizontal position on the vehicle support frame and a substantially vertical position; and
extensible actuator connected between the tilting frame and the loader for pivoting the loader between a retracted position substantially horizontal on the tilting frame and an extended position pivoted approximately 180 degrees off of the frame.

18. The apparatus of claim 1, further comprising at least one transverse conveyor mounted on the loader, the transverse conveyor laterally moving bales supported on the loader, and further comprising a traversing bale cutoff device connected to the vehicle support frame and traversing adjacent the loader to cut off portions of bales moved laterally by the transverse conveyor.

19. An apparatus for use with a transport vehicle to load, transfer, and unload bales of hay or straw and the like, the vehicle including a vehicle support frame, the apparatus comprising:
a tilting frame hingedly supported by the vehicle support frame, the tilting frame having a side member and pivoting between a substantially horizontal position and a substantially vertical position about a first pivot axis oriented generally horizontally and transverse to the vehicle;
a loader hingedly attached to and supported by the tilting frame, the loader pivoting about a second pivot axis proximate to and oriented generally parallel to the side member of the frame, the loader having a plurality of selectively actuated bale engaging tine structures for securing bales to the loader, each bale engaging tine structure having at least one tine movable between a retracted position and a bale engaging position;
a rub bar and a crowding bar connected to the vehicle support frame, the rub bar being aligned substantially parallel to the second pivot axis the crowding bar being substantially normal to the rub bar, the crowding bar and rub bar cooperating to properly positioning a group of bales relative to the loader;
whereby the loader pivots a group of bales from the ground approximately 180 degrees up and onto the tilting frame, which then tilts the group about said first pivot axis on said tilting frame.

20. An apparatus for use with a transport vehicle to load, transfer, and unload bales of hay or straw and the like, the vehicle including a vehicle support frame with a bale transport section, the apparatus comprising;
a tilting frame on said vehicle support frame adjacent said bale transport section and pivotally attached thereto by pivot means providing a generally horizontal first pivotal axis for pivoting said tilting frame from a generally horizontal lowered position to a generally vertical raised position extending upwardly from said vehicle support frame,
a loader frame on said tilting frame pivotally attached thereto by pivot means providing a generally horizontal second pivotal axis for pivoting said loader frame from a first generally horizontal position on the top of at least one bale through approximately 180 degrees to a second horizontal position on top of said tilting frame, and
said loader frame including selectively actuated bale engaging and disengaging means for holding bales thereto during loading,
said tilting frame being then movable to the vertical position about a second horizontal axis on said transport vehicle at right angles horizontal to said second pivot axis for delivering said at least one bale to the transport section of the vehicle support frame upon disengagement of said bale.

21. The apparatus of claim 20 wherein;
said vehicle support frame has a top surface with a longitudinal axis in the direction of travel of the vehicle,
said tilting frame being supported on the top surface of said vehicle support frame in the lowered position, and
the pivotal axis of said tilting frame extending generally transverse to the longitudinal axis of the vehicle support frame.

22. The apparatus of claim 21 wherein;
the pivotal axis of said loading frame extends generally transverse to the pivotal axis of said tiling frame and generally parallel to the longitudinal axis of said vehicle support frame.

23. A method for the pickup and loading of a bale, comprising the steps of;
pivoting a loader carried on a tilting frame about a first horizontal axis in a first direction to engage and grip a bale,
pivoting the loader about said first horizontal axis in the reverse direction through approximately 180 degrees to position the loader and the bale on the tilting frame carried by a transport vehicle, pivoting the tilting frame from a horizontal position to a vertical position about a second horizontal axis on said transport vehicle at right angles to said first horizontal axis, and releasing said bale onto said transport vehicle.

24. A method for the pick up and loading of bales onto a transport vehicle having a carrier bed, a tilting frame and a loader carried for pivoting about a first horizontal axis on the tilting frame, comprising the steps of;

positioning the transport vehicle adjacent a bale, pivoting the loader from a horizontal position in a first direction about said first horizontal axis to engage and grip the bale, pivoting the loader through approximately 180 degrees in the opposite direction to a horizontal position on the tilting frame, then pivoting said tilting frame through approximately 90 degrees to a vertical position about a second horizontal axis on said transport vehicle at right angles to said first horizontal axis, and releasing said bale onto said carrier bed for transport.

25. The method of claim 24 wherein said bale is gripped by rotatable tine members carried by said loader for selectively engaging and releasing said bale therefrom.

* * * * *

UNITED STATES PATENT AND TRADEMARK OFFICE
CERTIFICATE OF CORRECTION

PATENT NO. : 6,540,464 B1
DATED : April 1, 2003
INVENTOR(S) : Thomas B. Maclay

It is certified that error appears in the above-identified patent and that said Letters Patent is hereby corrected as shown below:

Column 10,
Line 39, replace "a second horizontal" with -- said first pivot --.

Signed and Sealed this

Twenty-sixth Day of August, 2003

JAMES E. ROGAN
*Director of the United States Patent and Trademark Office*